United States Patent
Garza et al.

(10) Patent No.: US 9,144,860 B2
(45) Date of Patent: Sep. 29, 2015

(54) ROBOTIC WELD GUN ORIENTATION NORMALIZATION

(75) Inventors: Frank Garza, Rochester Hills, MI (US); Brad Niederquell, Troy, MI (US)

(73) Assignee: Fanuc Robotics America Corporation, Rochester Hills, MI (US)

( * ) Notice: Subject to any disclaimer, the term of this patent is extended or adjusted under 35 U.S.C. 154(b) by 762 days.

(21) Appl. No.: 13/433,850

(22) Filed: Mar. 29, 2012

(65) Prior Publication Data
US 2013/0256278 A1    Oct. 3, 2013

(51) Int. Cl.
*B23K 11/31* (2006.01)
*B23K 11/11* (2006.01)
*B23K 11/25* (2006.01)

(52) U.S. Cl.
CPC ............... *B23K 11/115* (2013.01); *B23K 11/25* (2013.01); *B23K 11/315* (2013.01)

(58) Field of Classification Search
CPC combination set(s) only.
See application file for complete search history.

(56) References Cited

U.S. PATENT DOCUMENTS

| | | | |
|---|---|---|---|
| 3,795,054 A * | 3/1974 | Kinney | 33/505 |
| 4,258,425 A * | 3/1981 | Ramsey et al. | 700/248 |
| 4,263,803 A * | 4/1981 | Burkhardt | 73/1.81 |
| 4,447,697 A * | 5/1984 | Dunne et al. | 219/86.41 |
| 4,590,577 A * | 5/1986 | Nio et al. | 700/252 |
| 4,677,276 A * | 6/1987 | Nio et al. | 219/125.12 |
| 4,700,118 A * | 10/1987 | Kishi et al. | 318/568.19 |
| 4,831,235 A * | 5/1989 | Kishi et al. | 219/125.12 |
| 4,835,710 A * | 5/1989 | Schnelle et al. | 700/262 |
| 4,853,603 A * | 8/1989 | Onoue et al. | 700/262 |
| 4,906,418 A * | 3/1990 | Tokura et al. | 700/86 |
| 4,954,762 A * | 9/1990 | Miyake et al. | 318/568.19 |
| 5,053,976 A * | 10/1991 | Nose et al. | 700/251 |
| 5,063,281 A * | 11/1991 | Mizuno et al. | 219/125.12 |
| 5,171,966 A * | 12/1992 | Fukuoka et al. | 219/125.12 |
| 5,194,792 A * | 3/1993 | Hara | 318/568.13 |
| 5,303,333 A * | 4/1994 | Hoos | 700/245 |
| 5,345,540 A * | 9/1994 | Schleifer et al. | 700/251 |
| 5,471,395 A * | 11/1995 | Brien | 700/186 |
| 5,528,011 A * | 6/1996 | Kono et al. | 219/86.41 |
| 5,582,750 A * | 12/1996 | Hamura et al. | 219/124.34 |
| 5,600,759 A * | 2/1997 | Karakama | 700/252 |
| 5,675,229 A * | 10/1997 | Thorne | 318/568.11 |
| 5,705,906 A * | 1/1998 | Tanabe et al. | 318/568.13 |
| 5,829,115 A * | 11/1998 | Speller et al. | 29/525.06 |
| 5,898,285 A | 4/1999 | Nagasawa et al. | |
| 5,910,719 A * | 6/1999 | Thorne | 318/560 |
| 5,988,486 A * | 11/1999 | Kobayashi et al. | 228/212 |
| 6,008,612 A * | 12/1999 | Tanaka et al. | 318/652 |
| 6,044,308 A * | 3/2000 | Huissoon | 700/166 |
| 6,064,168 A * | 5/2000 | Tao et al. | 318/568.21 |
| 6,070,109 A * | 5/2000 | McGee et al. | 700/259 |
| 6,118,095 A * | 9/2000 | Nagano | 219/110 |

(Continued)

*Primary Examiner* — Dana Ross
*Assistant Examiner* — Renee L Miller
(74) *Attorney, Agent, or Firm* — Fraser Clemens Martin & Miller LLC; William J. Clemens

(57) ABSTRACT

A method for controlling a welding robot having a servo gun with a movable tip and a fixed tip includes the steps of separately contacting a surface of a part with the movable tip to measure a base test point and an at least two additional test points displaced from the base test point. Two non-collinear vectors are calculated from the at least two additional test points. A normal vector is calculated from the two non-collinear vectors. An angle between the original servo gun orientation and the normal vector is determined. An orientation of the servo gun may be corrected, for example, if the angle is within user specified tolerances.

20 Claims, 4 Drawing Sheets

(56) References Cited

U.S. PATENT DOCUMENTS

| | | | |
|---|---|---|---|
| 6,124,693 A * | 9/2000 | Okanda et al. | 318/568.11 |
| 6,163,759 A * | 12/2000 | Kita | 702/85 |
| 6,169,263 B1 * | 1/2001 | Derby et al. | 219/86.41 |
| 6,173,882 B1 * | 1/2001 | Booker et al. | 228/102 |
| 6,192,298 B1 * | 2/2001 | Nishikawa | 700/251 |
| 6,232,572 B1 * | 5/2001 | Kanjo | 219/110 |
| 6,337,456 B1 * | 1/2002 | Taniguchi et al. | 219/86.25 |
| 6,356,807 B1 * | 3/2002 | McGee et al. | 700/253 |
| 6,366,831 B1 * | 4/2002 | Raab | 700/262 |
| 6,374,158 B1 * | 4/2002 | Fusaro, Jr. | 700/254 |
| 6,453,213 B1 * | 9/2002 | Hong | 700/245 |
| 6,455,800 B1 * | 9/2002 | Janssens et al. | 219/86.41 |
| 6,487,785 B1 * | 12/2002 | Ritz | 33/561 |
| 6,515,251 B1 * | 2/2003 | Wind | 219/86.1 |
| 6,531,674 B2 * | 3/2003 | Suita | 219/86.41 |
| 6,717,098 B2 * | 4/2004 | Matsushita | 219/121.63 |
| 6,787,729 B2 * | 9/2004 | Dugas et al. | 219/86.32 |
| 6,941,192 B2 * | 9/2005 | Tang et al. | 700/254 |
| 7,377,049 B2 * | 5/2008 | Lim et al. | 33/645 |
| 7,420,137 B2 * | 9/2008 | Schmitt-Walter | 219/86.7 |
| 7,738,996 B2 * | 6/2010 | Luthardt | 700/245 |
| 7,956,308 B2 * | 6/2011 | Augustine et al. | 219/89 |
| 7,974,733 B2 * | 7/2011 | Gupta et al. | 700/179 |
| 8,395,081 B2 * | 3/2013 | Stimmel et al. | 219/121.67 |
| 8,457,786 B2 * | 6/2013 | Andersson | 700/245 |
| 8,504,316 B2 * | 8/2013 | Tamai et al. | 702/94 |
| 8,680,434 B2 * | 3/2014 | Stoger et al. | 219/137.7 |
| 2002/0038792 A1 * | 4/2002 | Terada et al. | 219/121.6 |
| 2002/0134762 A1 * | 9/2002 | Okanda et al. | 219/86.51 |
| 2003/0094441 A1 * | 5/2003 | Dugas et al. | 219/90 |
| 2004/0069750 A1 * | 4/2004 | Kato et al. | 219/86.1 |
| 2004/0074877 A1 * | 4/2004 | Hochhalter et al. | 219/86.41 |
| 2005/0045597 A1 * | 3/2005 | Wang et al. | 219/110 |
| 2005/0150874 A1 * | 7/2005 | Cabanaw et al. | 219/109 |
| 2006/0243706 A1 * | 11/2006 | Schmitt-Walter | 219/86.7 |
| 2007/0131655 A1 * | 6/2007 | Spinella et al. | 219/61.4 |
| 2007/0187370 A1 * | 8/2007 | Hochhalter et al. | 219/86.32 |
| 2008/0308533 A1 * | 12/2008 | Takahashi et al. | 219/117.1 |
| 2009/0107961 A1 * | 4/2009 | Zaffino et al. | 219/76.14 |
| 2009/0152253 A1 * | 6/2009 | Wang et al. | 219/137 R |
| 2011/0089146 A1 | 4/2011 | Takahashi et al. | |
| 2011/0120978 A1 * | 5/2011 | Takahashi et al. | 219/86.25 |
| 2011/0180516 A1 * | 7/2011 | Takahashi et al. | 219/86.41 |
| 2012/0018408 A1 * | 1/2012 | Wang et al. | 219/117.1 |
| 2012/0043308 A1 * | 2/2012 | Sato et al. | 219/158 |

* cited by examiner

ROBOTIC WELD GUN ORIENTATION NORMALIZATION

FIELD OF THE INVENTION

The present invention relates generally to a welding robot system and method and, more particularly, to a method for correcting an orientation of a spot welding servo gun of the welding robot system.

BACKGROUND OF THE INVENTION

Welding robot systems having spot welding guns are described, for example, in U.S. Pat. Appl. Pub. No. 2011/0089146 to Takahashi et al. and U.S. Pat. No. 5,898,285, to Nagasawa et al. A typical spot welding servo gun includes a main body having a stationary electrode tip and a movable electrode tip. The stationary electrode tip is disposed opposite the movable electrode tip. The stationary electrode tip is generally immovable relative to the main body of the spot welding gun, and the movable electrode tip is mounted on the main body and opened and closed during a welding operation.

Both electrode tips must press a part with equal force, for good weld quality If the tips do not touch the part, re-teaching or teach correction is required. However, the teach correction of the welding robot is time consuming.

The known automatic teach correction methods do not determine whether the gun electrodes are normal to a surface of the part being welded, so orientation of the spot welding gun is not corrected. Orientation error, where the spot welding servo gun is not normal to a part to be welded, undesirably results in uneven force distribution, uneven current density over the spot, and, ultimately, poor weld quality. Orientation error can be difficult and time consuming to correct, especially when one of the gun electrodes is not completely visible.

There is a continuing need for a method for correcting an orientation of a spot welding gun, including determining a normal vector relative to a surface of a part to be welded. Desirably, this information is used to correct the orientation of the spot welding gun prior to a welding operation.

SUMMARY OF THE INVENTION

In concordance with the instant disclosure, a method for correcting an orientation of a spot welding gun, including determining a normal vector relative to a surface of a part to be welded, and correcting the orientation of the spot welding gun prior to a welding operation, is surprisingly discovered.

In an illustrative embodiment, the method of the present disclosure provides an ability to automatically determine a correct orientation for a servo weld gun, for example, a normalized orientation, without external sensors. The orientation correction method can be initiated via a program editor to correct a single point, or via a digital input to correct an entire program. In program correction mode, a robot sequentially moves through the welding program to determine the proper orientation, and corrects the servo gun orientation. A welding sequence can be performed during the correction process, to increase flexibility of this function. For example, the program correction mode can be used during production or offline, as desired. The method may also generate a file that reports the points or positions that were corrected, the amount of correction, and other data. Position correction can be limited to a specific tolerance, if desired.

The method may further employ disturbance torque feedback from at least one motor controlling the servo weld gun's moveable electrode to detect part locations at multiple points in three dimensional space. Where a normal vector based on the locations of the multiple points is found, the robot orientation may be changed accordingly. At least one of the position and the orientation of the robot in the welding program may be updated or recorded.

It should be appreciated that the panel surface around a spot point may change or may not exist. Also, a robot arm may collide with the part or another object in the work cell, when moving to test points around the spot point. In short, the actual surface available for detection at each spot is limited, i.e., is point dependent. As such, search patterns may be selected based on surface available. These patterns can be specified with the spot instruction (for example, at run-time, inside the program), or by a search configuration selection (for example, offline by operator, via program editor).

A number of search pattern shapes may be employed. Search pattern shapes include a test point at the center, to obtain the following benefits:
 reduced servo gun open distance for search;
 use of same detection threshold at all test points;
 a reference value for cross check/validation; and
 use of a same offset and gun open distance at all test points.

In one embodiment, a method for controlling a welding robot having a servo gun with a movable tip and a fixed tip includes the steps of contacting a surface of a part with the movable tip to measure a base test point, and at least two additional test points displaced from the base test point. Two non-collinear vectors are created from the additional test point measurements, and a normal vector is calculated from these vectors. The servo gun orientation is modified to this normal vector.

In a further embodiment, the additional test points provide a predetermined search pattern shape. Again, the orientation of the servo gun is modified to this normal vector.

In another embodiment, a position of the servo gun in a robot welding program may be corrected based upon the comparison of the orientation of the servo gun to the normal vector.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figures 1, 2, 3, 4:
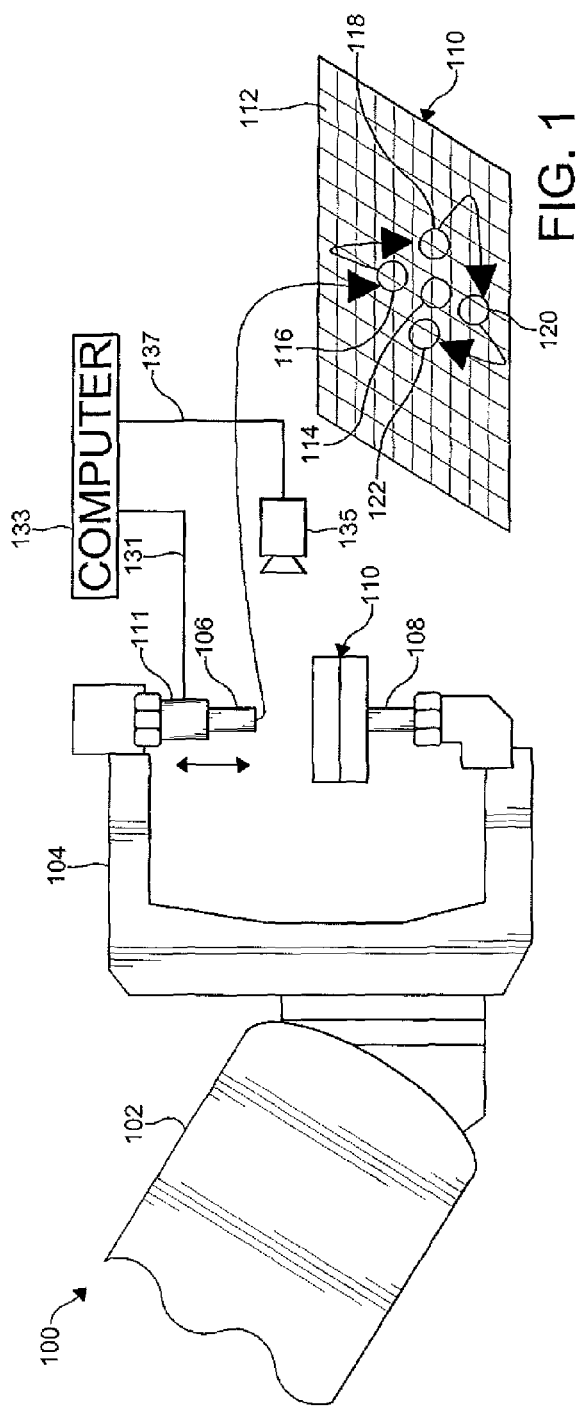
FIG. 1 is a schematic representation of a robotic weld gun according to one embodiment of the disclosure, and further showing a method for orientation normalization with the robotic weld gun.
FIGS. 2-4 are schematic representations of a movable tip of the robotic weld gun shown in FIG. 1, and further showing a stepwise orientation correction, location correction, and distance correction to provide a desired spot weld location for the servo gun.

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

FIG. 1 shows a robotic welding system 100 for use with a method according to the present disclosure. The robotic welding system 100 includes a welding robot 102 having a servo gun 104 with a movable tip 106 and a fixed tip 108. The welding robot 102 is configured to weld a part 110, such as a metal panel for an automobile. Other types of parts 110 may also be welded with the robotic welding system 100 of the present disclosure.

The movable tip 106 may be coupled to at least one motor 111 configured to actuate the movable tip 106 in a direction toward the part 110, for example. The at least one motor 111 may be a servomotor, for example, configured to provided automatic feedback for fine position control. One of ordinary skill in the art may also employ other means of actuating the movable tip 106, as desired.

As further shown in FIG. 1, the method of the present disclosure includes the steps of contacting a surface 112 of the part 110 with the movable tip 106 to measure a base test point 114, and subsequently contacting the surface 112 with the movable tip 106 to measure an at least two additional test points 116, 118, 120, 122 displaced from the base test point 114. Two non-collinear measurement vectors are calculated from the at least two additional test points 116, 118, 120, 122. A normal vector is calculated from these two vectors, and an angle between the normal vector and vector of original servo gun orientation 104 is determined.

The method may further include the step of adjusting the orientation of the servo gun 104 relative to the normal vector. The adjustment can be performed conditionally, based on the angle between the original orientation (vector) and the normal vector. For example, orientation correction can be skipped if the angle between the normal vector and the original orientation of the servo gun is too large. Other types of adjustments to the orientation of the servo gun 104 may also be used within the scope of the present disclosure.

In a particular embodiment shown in FIGS. 2-4, the movable tip 106 of the servo gun 102 may undergo a stepwise orientation correction (FIG. 2), location correction (FIG. 3), and distance correction (FIG. 4) to provide a desired spot weld location 124 for the servo gun 102. In particular, once the normal vector is calculated, the servo gun 104 may be moved to a normal or corrected location for the desired spot weld 124. An angle of the movable tip 106 relative to the normal vector may also be determined, and an adjustment made accordingly for the movable tip 106 to maintain part 110 contact, after rotation.

Figure 5:
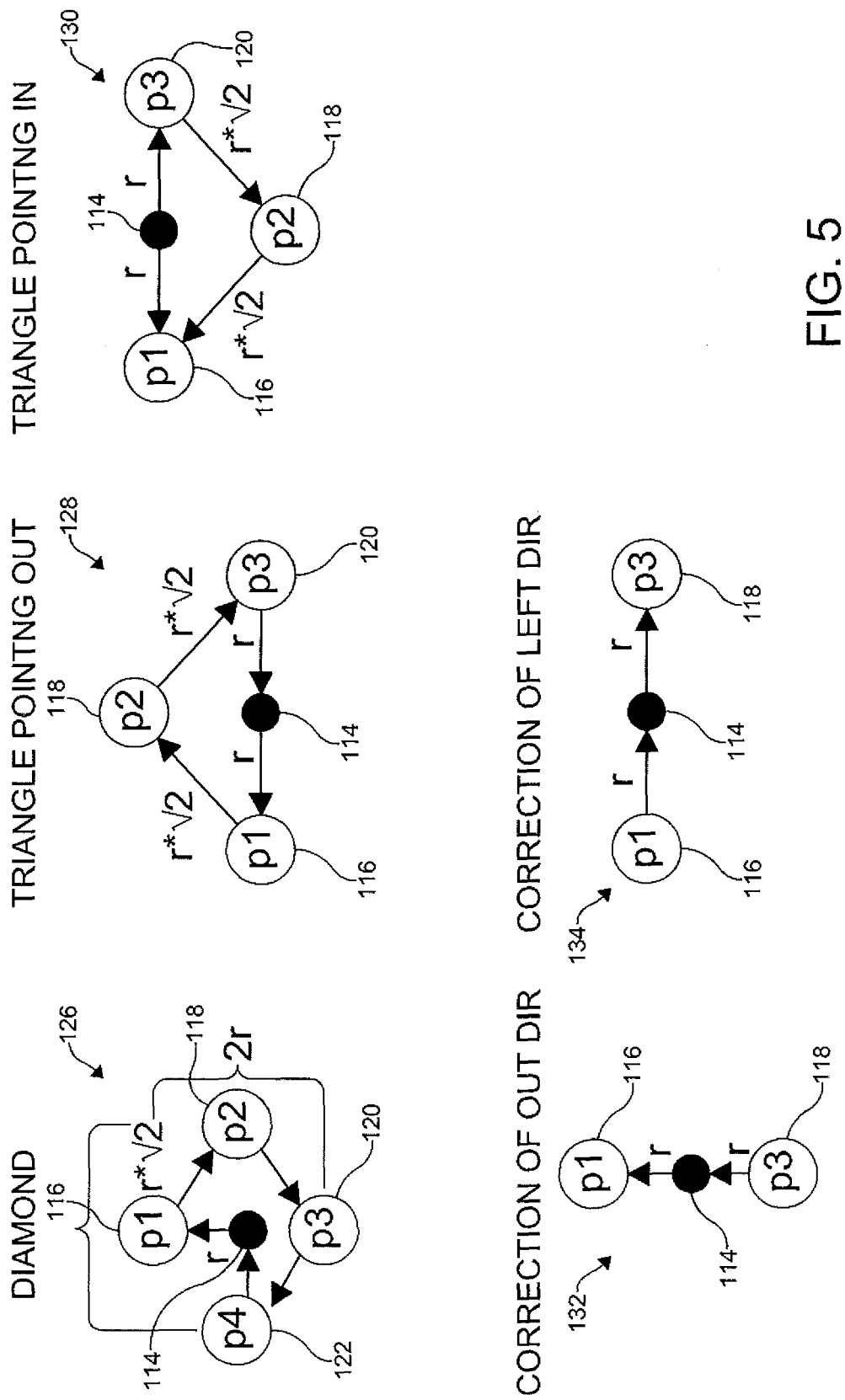
FIG. 5 is a schematic representation of a variety of test location patterns that may be performed by the robotic weld gun shown in FIG. 1, using the described method for orientation normalization.

Referring now to FIG. 5, the method of the present disclosure may further include the step of specifying a test point shape from which to calculate the normal vector. The test point shape may be dictated by a shape of the surface 112 of the part 110 to be welded, for example. The robotic welding system 100 may create the test point shape by moving the servo gun 104 and the movable tip 106 from the base test point 114 to the at least two additional test points 116, 118, 120, 122 in a predetermined pattern. The test point shape may be conducted rapidly before commencement of the welding operation. The speed at which the movable tip 106 is moved from one location to another may be 250 mm/sec, for example. Other speeds for forming the test point shape may also be used within the scope of the disclosure.

Where the correction of the orientation in a plurality of different directions is desired, such as in an outer direction and a lateral direction relative to the servo gun 104, the test point shape may include the base test point 114 and at least three of the additional test points 116, 118, 120, 122. As nonlimiting examples, the test point shape may include one of a diamond-shape 126, an outwardly pointed triangle-shape 128, and an inwardly pointed triangle-shape 130. Where the correction of the orientation in a single direction is desired, such as in only the outer direction or in only the lateral direction relative to the servo gun 104, the test point shape may include the base test point 114 and two additional test points 116, 118. As nonlimiting examples, the test point shape may include one of an outwardly pointed line 132 and a laterally pointed line 134.

In another example, the test point shape may be created by providing a search radius around the base test point 114 on which the at least two additional test points 116, 118, 120, 122 is tested. In one embodiment, the default radius is about +/−5 mm from the base test point 114. Other types of test point shapes having different numbers and configurations of the additional test points 116, 118, 120, 122, as well as different search radii, may also be used.

It should also be understood the at least two additional test points 116, 118, 120, 122 may be aligned with the part 110, and may have a predetermined clearance for rotation error based on a translation distance between at the base test point 114 and the at least two additional test points 116, 118, 120, 122. The predetermined clearance for the rotation error may be selected for each particular part 110, as desired.

In determining the base test point 114 and the at least two additional test points 116, 118, 120, 122 on the surface 112 of the part 110, the present method may include a measuring of a distance between the movable tip 106 and the surface 112. In particular, the distance may be a distance in the Z direction, as shown in FIGS. 2-4. For example, the distance in the Z direction may be recorded until contact with the surface 112 occurs for each of the original and additional test points 114, 116, 118, 120, 122. The plurality of measured distances may be used to determine the plane and the normalized vector relative to the surface 112 of the part 110.

In a particular embodiment, the step of detecting the base test point 114 and the at least two additional test points 116, 118, 120, 122 during the steps of contacting the part 110 may include an electrical continuity measurement. For example, where the part 110 is grounded, the movable tip 106 is determined to have contacted the surface 112 when a tip voltage drops below a predetermined level due to contact of the movable tip 106 with the surface 112 of the grounded part 110. As shown in FIG. 1, the electrical continuity measurement may be communicated via a signal line 131 to a computer 133 such as a servo gun controller or a robot controller, as nonlimiting examples, The predetermined voltage and means for measuring the voltage of the movable tip 106 may be selected by a skilled artisan, as desired.

In another embodiment, the step of detecting the base test point 114 and the at least two additional test points 116, 118, 120, 122 during the steps of contacting the part 110 may include a non-contact optical sensor 135 in communication with the computer 133 by a signal line 137, as shown in FIG. 1. The non-contact optical sensor 135 may measure the distance in the Z direction between the movable tip 106 and the surface 112 of the part 110. For example, the non-contact optical sensor 135 may be at least one of an electric eye and a laser beam detector. One of ordinary skill in the art may select other types of non-contact optical sensors 135 for measuring the contact of the movable tip 106 with the surface 112 of the part 110, as desired.

The step of detecting the base test point 114 and the at least two additional test points 116, 118, 120, 122 during the steps of contacting the part 110 may be conducted by measuring a disturbance torque feedback of the movable tip 106 at the motor 111. The disturbance torque feedback may also be communicated to the computer 133 by signal line 131, or by other means, as desired.

Figure 6:
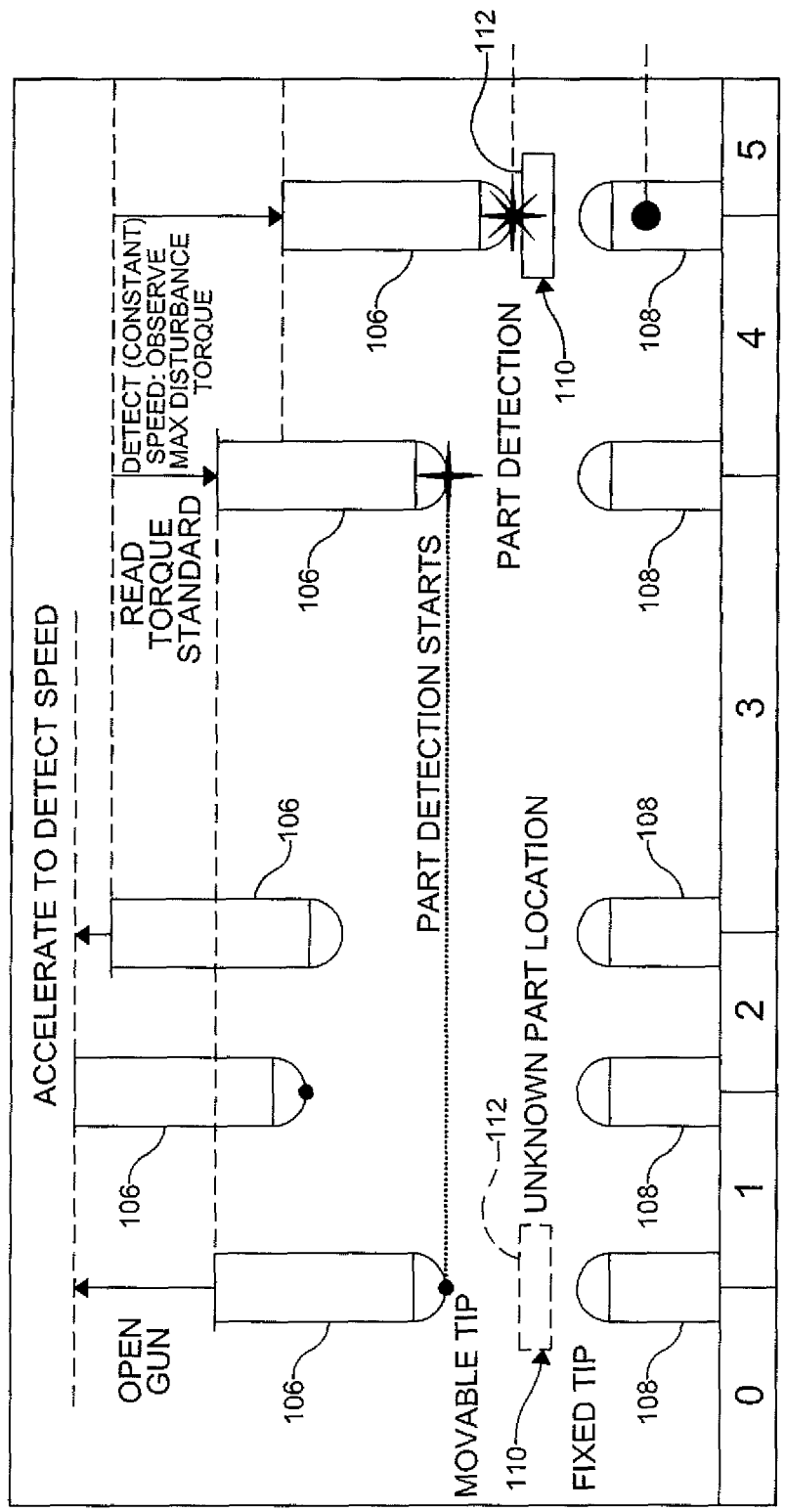
FIG. 6 is a schematic representation of a movable tip and a fixed tip of the robotic weld gun shown in FIG. 1, and further showing a stepwise detection of a part location in three dimensional space using disturbance torque feedback from a motor controlling the moveable electrode.

An illustrative detection sequence using disturbance torque feedback for each of the locations 114, 116, 118, 120, 122 is shown in FIG. 6. In an initial position, when a location of the surface 112 of the part 110 is unknown (shown in dashed lines in FIG. 6), the servo gun 104 may be opened to a predetermined backup distance. The servo gun 104 and the movable tip 106 are then accelerated to a next location, and a speed of the servo gun 104 detected. The servo gun 104 then begins to close by actuating the movable tip 106 toward the part 110. The movement of the movable tip 106 facilitates the reading of a torque standard, since the torque reading becomes stable after the movable tip 106 begins to move. After the torque standard is obtained, the part 110 detection itself begins and is completed upon the detection of a torque feedback different from the torque standard, which is indicative of the movable tip 106 having contacted the surface 112 of the part 110. The measurement of the base test point 114 and the at least two additional test points 116, 118, 120, 122 using disturbance torque feedback, which advantageously does not require the use of separate sensors or equipment to measure the distance to the surface 112, is thereby provided.

Other means for measuring the distances to the base test point 114 and the at least two additional test points 116, 118, 120, 122 may also be used within the scope of the present disclosure.

Figure 7:
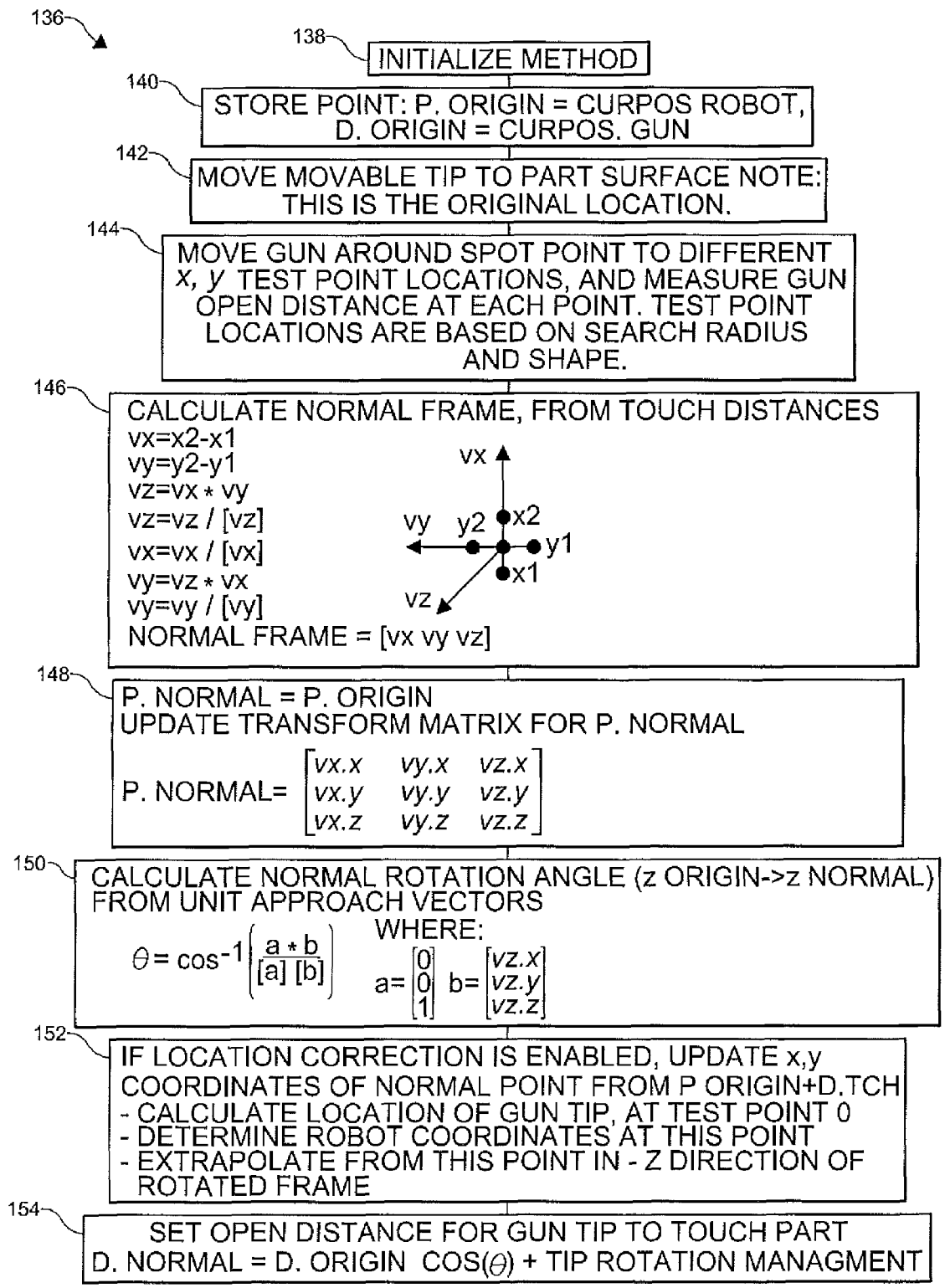
FIG. 7 is a flow diagram illustrating a method for orientation normalization according to a particular embodiment of the present disclosure, and using the robotic weld gun shown in FIG. 1.

With reference to FIG. 7, one particular orientation normalization method 136 using the robotic weld gun 102 is shown. After an initialization step 138, in which a user begins the orientation normalizing method 136 for the part 110 to be welded, the orientation normalization method 136 determines and stores the current position (CURPOS) of the robot 102 and the current position of the servo gun 104 in a baseline step 140. The movable tip 106 is then moved to the surface 112 of the part 110 in an original location step 142, which provides the base test point 114. The servo gun 104, and likewise the movable tip 106, is then moved to each of the at least two additional test points 116, 118, 120, 122 in a test shape step 144, as described further hereinabove. Two non-collinear vectors are calculated from test point measurements. In a normal vector calculation step 148, the normal vector is calculated from two measurement vectors. The predefined calculations include, but are not limited to, the calculations shown in FIG. 7. The rotation angle between the original orientation (vector) and normal vector are determined in step 150. If the user permits the correction to occur, then in a correction step 152 the servo gun 104 is moved to the calculated coordinates, defined by the normal vector. In completion step 154, the servo gun 104 is opened and made ready for a welding operation on the part 110.

The present method may further include the step of correcting a position of the servo gun 104 in a robot welding program, for example, being executed on a robot controller (not shown). The correction to the position of the servo gun 104 in the program may be based upon the comparison of the angle between original orientation of the servo gun 104 (vector) and the normal vector. The correction of the program to be executed may be conducted in addition to permitting a normalization of the orientation of the servo gun 104 and the movable tip 106 relative to the surface 112 of the part 110, or as an alternative to the normalization of the orientation, as desired.

Advantageously, the method of the present disclosure provides the ability to automatically determine correct, for example, normalized, orientation for the servo gun 104 of the robot 102, without using external sensors. Due to the avoidance of orientation error, where the servo gun 104 is not normal to the part 110, uneven force distribution, uneven current density over spot, and ultimately, poor weld degradation are militated against.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for controlling a welding robot having a servo gun with a movable tip and a fixed tip, the method comprising the steps of:
    contacting a surface of a part with the movable tip to measure a base test point;
    displacing the movable tip away from the base test point and contacting the surface with the movable tip at different locations displaced from the base test point to measure an at least two additional test points on the surface displaced from the base test point;
    calculating two non-collinear vectors from the at least two additional test points;
    calculating a normal vector from the two non-collinear vectors; and
    comparing an angle between an original servo gun orientation and the normal vector.

2. The method of claim 1, further comprising the step of adjusting the orientation of the servo gun relative to the normal vector.

3. The method of claim 1, wherein the normalized orientation is recorded into a robot welding program.

4. The method of claim 1, further comprising the step of specifying a test point shape based on a shape of the surface of the part.

5. The method of claim 4, wherein the test point shape includes the base test point and two additional test points.

6. The method of claim 5, wherein the orientation of the servo gun is adjusted in a single direction.

7. The method of claim 4, wherein the test point shape includes the base test point and at least three additional test points.

8. The method of claim 7, wherein the orientation of the servo gun is adjusted in a plurality of directions.

9. The method of claim 4, wherein the test point shape is one of a diamond-shape, an outwardly pointed triangle-shape, an inwardly pointed triangle-shape, an outwardly pointed line, and a laterally pointed line.

10. The method of claim 1, wherein the at least two additional test points are aligned with the part and have a predetermined clearance for rotation error based on a translation distance between at the base test point and the at least two additional test points.

11. The method of claim 1, further including the step of measuring a distance between the movable tip and the surface at the base test point and the at least two additional test points during the steps of contacting the part.

12. The method of claim 1, further including the step of detecting the base test point and the at least two additional test points during the steps of contacting the part with disturbance torque feedback of the movable tip.

13. The method of claim 1, further including the step of detecting the base test point and the at least two additional test points during the steps of contacting the part with an electrical continuity measurement.

14. The method of claim 13, wherein the part is grounded and the movable tip is determined to have contacted the surface when a tip voltages drops below a predetermined level due to contact with the surface of the grounded part.

15. The method of claim 1, further including the step of detecting the base test point and the at least two additional test points during the steps of contacting the part with a non-contact optical sensor.

16. The method of claim 15, wherein the non-contact optical sensor measures a distances between the movable tip and the surface of the part.

17. The method of claim 15, wherein the non-contact optical sensor is at least one of an electric eye and a laser beam detector.

18. The method of claim 1, further comprising the step of correcting a position of the servo gun in a robot welding program based on an angle between the original servo gun orientation and the normal vector.

19. A method for controlling a welding robot having a servo gun with a movable tip and a fixed tip, the method comprising the steps of:
   contacting a surface of a part with the movable tip to measure a base test point;
   displacing the movable tip away from the base test point and contacting the surface with the movable tip at different locations displaced from the base test point to measure an at least two additional test points on the surface displaced from the base test point, the base test point and the at least two additional test points providing a predetermined search pattern shape;
   calculating two non-collinear vectors from the base test point and the at least two additional test points;
   calculating a normal vector from the two test non-collinear vectors;
   comparing an angle between an original servo gun orientation and the normal vector; and
   adjusting the orientation of the servo gun relative to the normal vector.

20. A method for controlling a welding robot having a servo gun with a movable tip and a fixed tip, the method comprising the steps of:
   contacting a surface of a part with the movable tip to measure a base test point;
   displacing the movable tip away from the base test point and contacting the surface with the movable tip at different locations displaced from the base test point to measure an at least two additional test points on the surface displaced from the base test point, the base test point and the at least two additional test points providing a predetermined search pattern shape;
   calculating two non-collinear vectors from the base test point and the at least two additional test points;
   calculating a normal vector from the two test non-collinear vectors;
   comparing an angle between an original servo gun orientation and the normal vector; and
   correcting a position of the servo gun in a robot welding program based upon the comparison of the orientation of the servo gun to the normal vector.

* * * * *